United States Patent [19]

McDonald et al.

[11] Patent Number: 5,222,248
[45] Date of Patent: Jun. 22, 1993

[54] CALL HAND-OFF WITH USER SELECTABLE SITE SWITCHING

[75] Inventors: Daniel J. McDonald; Gregory N. Hesse, both of Hanover Park; Thaddeus A. Kozlowski, Chicago, all of Ill.

[73] Assignee: Motorola, Inc., Schaumburg, Ill.

[21] Appl. No.: 608,143

[22] Filed: Nov. 1, 1990

[51] Int. Cl.$^5$ ............................................. H04Q 7/00
[52] U.S. Cl. ............................ 455/33.2; 455/54.2; 455/56.1
[58] Field of Search ............... 465/33, 53, 54, 56, 465/33.1, 33.2, 53.1, 54.1, 54.2, 56.1; 379/58, 59, 60, 63

[56] References Cited

U.S. PATENT DOCUMENTS

| | | | |
|---|---|---|---|
| 3,663,762 | 5/1972 | Joel, Jr. | 179/41 A |
| 3,819,872 | 6/1974 | Hamrick | 179/41 A |
| 3,896,390 | 8/1975 | Wells et al. | 179/41 A |
| 3,906,166 | 9/1975 | Cooper et al. | 179/41 A |
| 4,347,625 | 8/1982 | Williams | 455/33 |
| 4,553,263 | 11/1985 | Smith et al. | 455/54 |
| 4,556,760 | 12/1985 | Goldman | 179/2 EB |
| 4,736,453 | 4/1988 | Schloemer | 455/56 |
| 4,821,310 | 4/1989 | Lynk, Jr. et al. | 455/54 |
| 4,885,780 | 12/1989 | Gopal et al. | 379/221 |

*Primary Examiner*—Reinhard J. Eisenzopf
*Assistant Examiner*—Edward Urban
*Attorney, Agent, or Firm*—Susan L. Lukasik; Steven G. Parmelee

[57] ABSTRACT

In a trunked communication system with at least two communication sites, a call hand-off mid-call may occur when a mobile radio (109) moves from the coverage area of one site to the coverage area of another site. This second site may not have any communication resources available for this hand-off, and the radio (109) is issued a busy message. With user selectable site switching, the user may enter into the radio (221) the desire to return to the previous site, and the radio moves to the previous channel to continue (229) receiving the call.

20 Claims, 3 Drawing Sheets

CALL HAND-OFF WITH USER SELECTABLE SITE SWITCHING

FIELD OF THE INVENTION

This invention is concerned with trunked communication systems. More particularly, this invention is concerned with call hand-off in a trunked communication system.

BACKGROUND OF THE INVENTION

Typically, a multi-site trunked communication system includes communication units, communication sites, communication resources, and a communication resource allocator, also called a central controller. Each site has a substantially distinct coverage area and is geographically located throughout the system. A number of communication resources are assigned to each site, where at least one of the communication resources is used as a control channel, while the remaining communication resources are used as voice and/or data channels, hereafter referred to simply as channels. Base stations or repeaters are used to generate the communication resources and are located at the site. The communication resources may be telephone connections, TDM time slots, carrier frequencies, and/or frequency pairs.

The communication units, also called subscribers, are arranged in talk groups and may be located anywhere within the system (in the coverage area of any site). When a subscriber from a talk group requests a group call, it transmits, via the control channel of the site in which it is located, an inbound signalling word (ISW) to the central controller. A group call allows all members of the same talk group that are located within the system to communicate with each other. The ISW generally comprises the requesting subscriber's individual identification number, the requesting subscriber's talk group, and a request for a group call. The ISW may contain more or less information, depending on the system.

Upon receiving the ISW, the central controller determines if there is an available channel in each site. If a channel is not available in each site, the central controller will not place the group call and instead transmits an outbound signalling word (OSW) to the requesting subscriber. The OSW generally comprises, at least, a site busy signal, which indicates that the group call was not placed because at least one site did not have an available channel. When a channel becomes available in each site, and the requesting subscriber has not cancelled the group call request, the central controller allocates a channel in each site to the requesting subscriber's talk group.

At times, when a mobile subscriber unit is active in a group or individual call, the mobile unit travels out of the coverage area of its current site, causing the call to become degraded and even lost. The call may then be handed off to another site for completion. One method of call hand-off begins when a subscriber, while receiving a call, determines that it must switch to a new site to complete the call because the subscriber is at the edge of the RF range of its current site. The subscriber finds the next best control channel and issues an ISW at the new site. The central controller acknowledges the request to continue the call. If a channel is available at the new site, the central controller assigns a channel and issues a channel grant for the radio. The radio accepts the channel grant and goes to the assigned channel to continue the call. If no channel is available, the central controller issues a busy OSW for this call and the subscriber is unable to continue the call at the new site.

The subscriber requesting registration at a new site for call completion is likely to be issued a busy OSW if the system has a relatively high volume of calls. He may lose the call completely before a new channel is assigned. Since the user has his subscriber to receive important calls, this is not acceptable.

DESCRIPTION OF A PREFERRED EMBODIMENT

The following describes a method and apparatus for multi-site call hand-off with user selectable site switching in a trunked dispatch communication system. In the preferred embodiment of the invention, when call hand-off results in a busy signal returning to the subscriber, the user may then select through his subscriber, such as a SPECTRA mobile radio available from Motorola, Inc., to switch back to the previous site where he was receiving the call. The radio then notifies the central controller, such as a Smartzone Controller available from Motorola, Inc., that it is desired to retain the previous channel for completion of the current call. The central controller makes the appropriate channel assignments, and the call continues on the previously assigned channel. Thus, a busy OSW at call hand-off does not cause the user to miss the completion of his call.

Figure 1A:
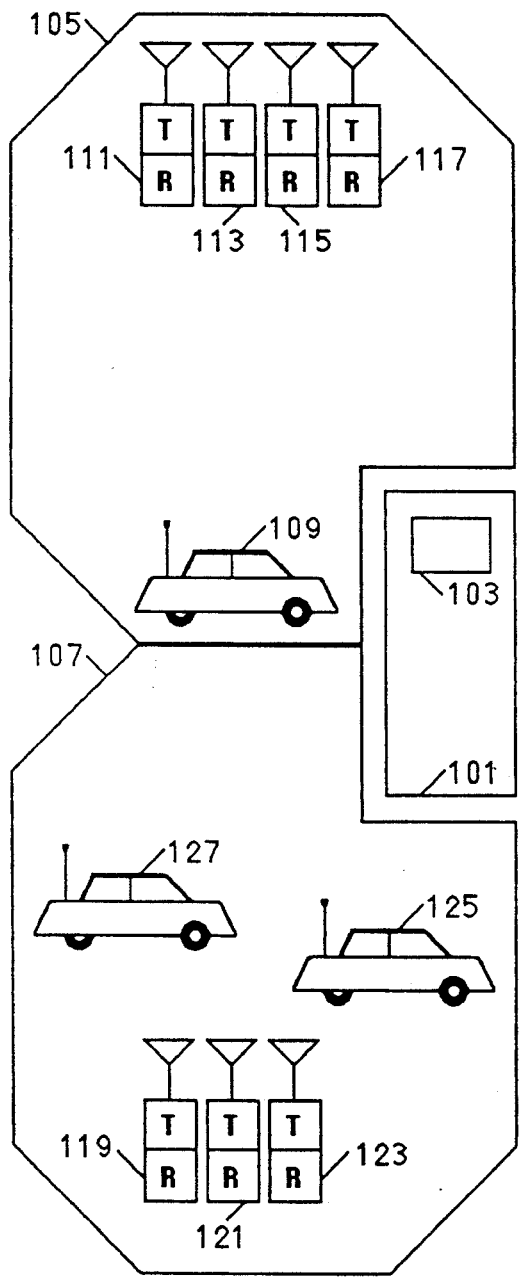
FIGS. 1A and 1B are block diagrams depicting a trunked system with call hand-off in accordance with the invention.
Figure 1B:
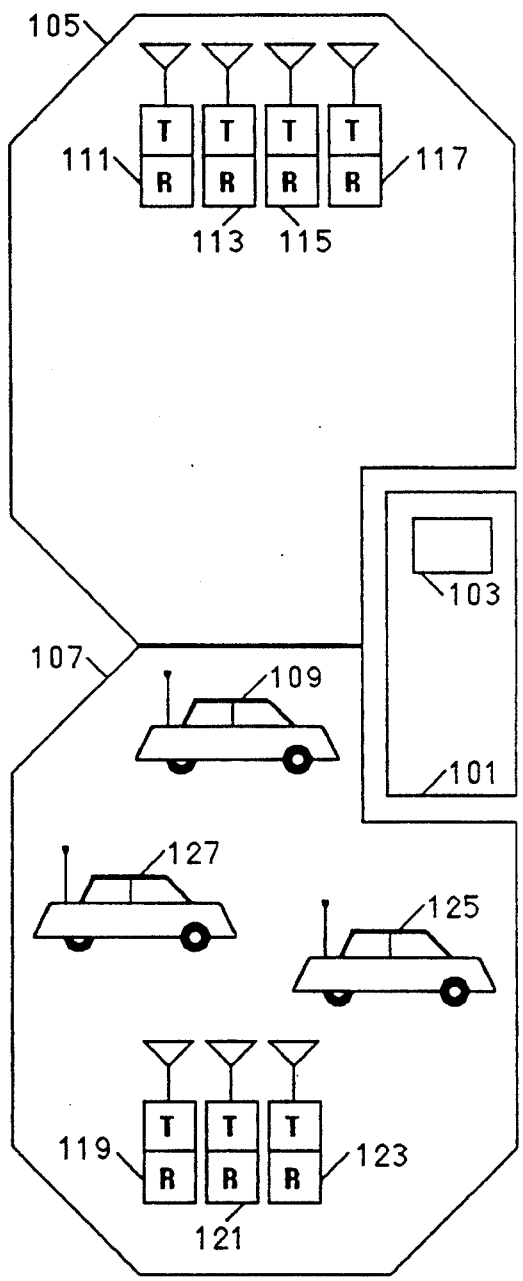

Referring to FIG. 1A, a block diagram of a trunked system with call hand-off in accordance to the invention can be found. The system has a central controller 101 with a channel assignment database 103. The first site with a first coverage area 105 has a control channel, generated by a base station 111, and three voice/data channels, also generated by base stations 113, 115, 117. A mobile subscriber 109 in the first coverage area 105 is on a call assigned to the voice channel of the second base station 113 and is nearing the edge of the coverage area 105. The second site with a second coverage area 107, adjacent to the first coverage area 105, has a control channel, generated by a base station 119, and two voice/data channels, also generated by base stations 121, 123. Within the second coverage area 107, a first mobile subscriber 125 is on a call on the voice channel generated by the second base station 121, and a second mobile 127 is on a call on the voice channel generated by the third base station 123. The other parties to the calls on the voice channels generated by base stations 113, 121, 123 are not shown. FIG. 1B shows the same system, only the mobile subscriber 109 from the first coverage area 105 has travelled into the second coverage area 107. The shape of the coverage areas 105, 107 was chosen strictly for illustrative purposes.

The procedure for user selectable site switching is as follows. Once the mobile subscriber 109 nears the edge of the first coverage area 105 during its call, it looks for the next best control channel by a scanning and receiving method. The subscriber finds a control channel, generated by the first base station 119 in the adjacent coverage area 107, and issues an ISW to the new site. The subscriber 109 informs the user that it has lost the call, because it had to leave the voice channel of the first base station 113 of the first coverage area for the control channel of the first base station 119 of the second coverage area. The central controller 101 acknowledges the request and tries to continue the call. Because the base stations 121, 123 generating both voice channels are occupied at the site in the second coverage area 107, the central controller 101 issues a busy OSW on the control channel for this call. The subscriber 109 informs the user of the busy OSW. The user can then choose to return to the previous site's channel 113 by entering the desire into the subscriber. The subscriber 109 then deregisters from the new site 107, informs the central controller 101 that it is returning to the previous channel 113, and attempts to receive on the previous channel 113. A selectable feature of the present invention is to deallocate the channel 113 at the old site 105 only after a specified time-out, not immediately after hand-off, to allow the user the option of returning to the old channel 113 for call completion.

Figure 2:
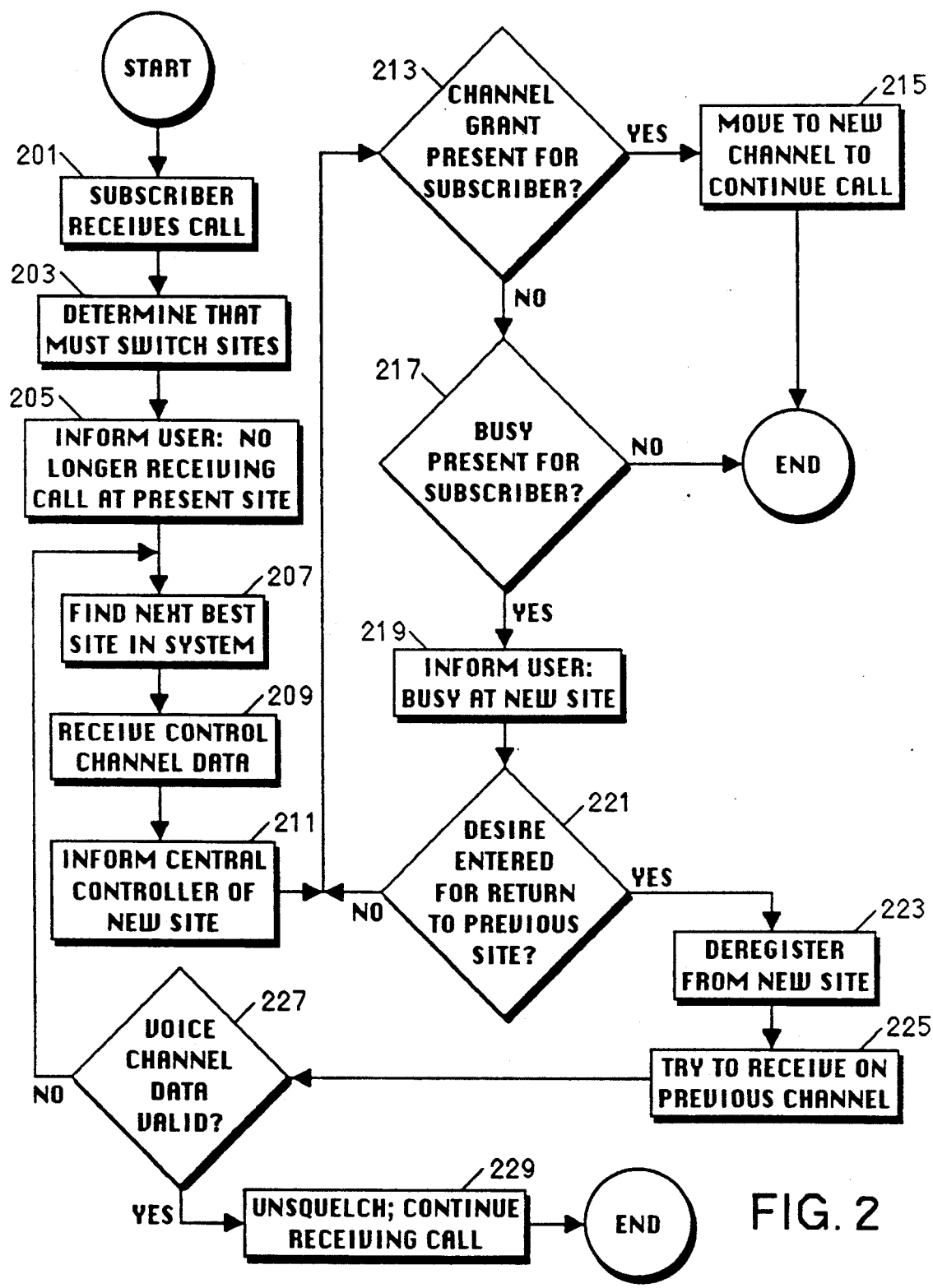
FIG. 2 is a flowchart illustrating multi-site call hand-off with user selectable site switching in a subscriber unit in accordance with the invention.

Multi-site call hand-off with user selectable site switching in a subscriber is shown in a flowchart in FIG. 2. Briefly, while the subscriber is receiving a call at 201, it determines that it must switch sites at 203. The subscriber informs the user that it is no longer receiving the call at the present site at 205. It then finds the next best site in the system at 207 and receives control channel data from that site at 209. It issues an ISW to inform the central controller of its new site at 211. If a channel grant is present for the subscriber at the new site at 213, it moves to the new channel to continue the call at 215. If a busy is present for the subscriber at 217, the subscriber informs the user at 219. If the user enters a desire to return to the previous site at 221, the subscriber deregisters from the new site at 223 and tries to receive on the previous voice channel at 225. If the voice channel is valid at 227, the subscriber unsquelches and continues receiving the call at 229. If the channel is not valid at 227, the subscriber repeats the process by first finding the next best site in the system at 207 and continuing from there. An alternative implementation reflects automatic return to the previous site by the subscriber. The description from FIG. 2 remains the same, except that no decision at 221 is required, and flow moves directly from the subscriber informing the user of the busy at 219 to deregistering from the new site at 223.

Figure 3:
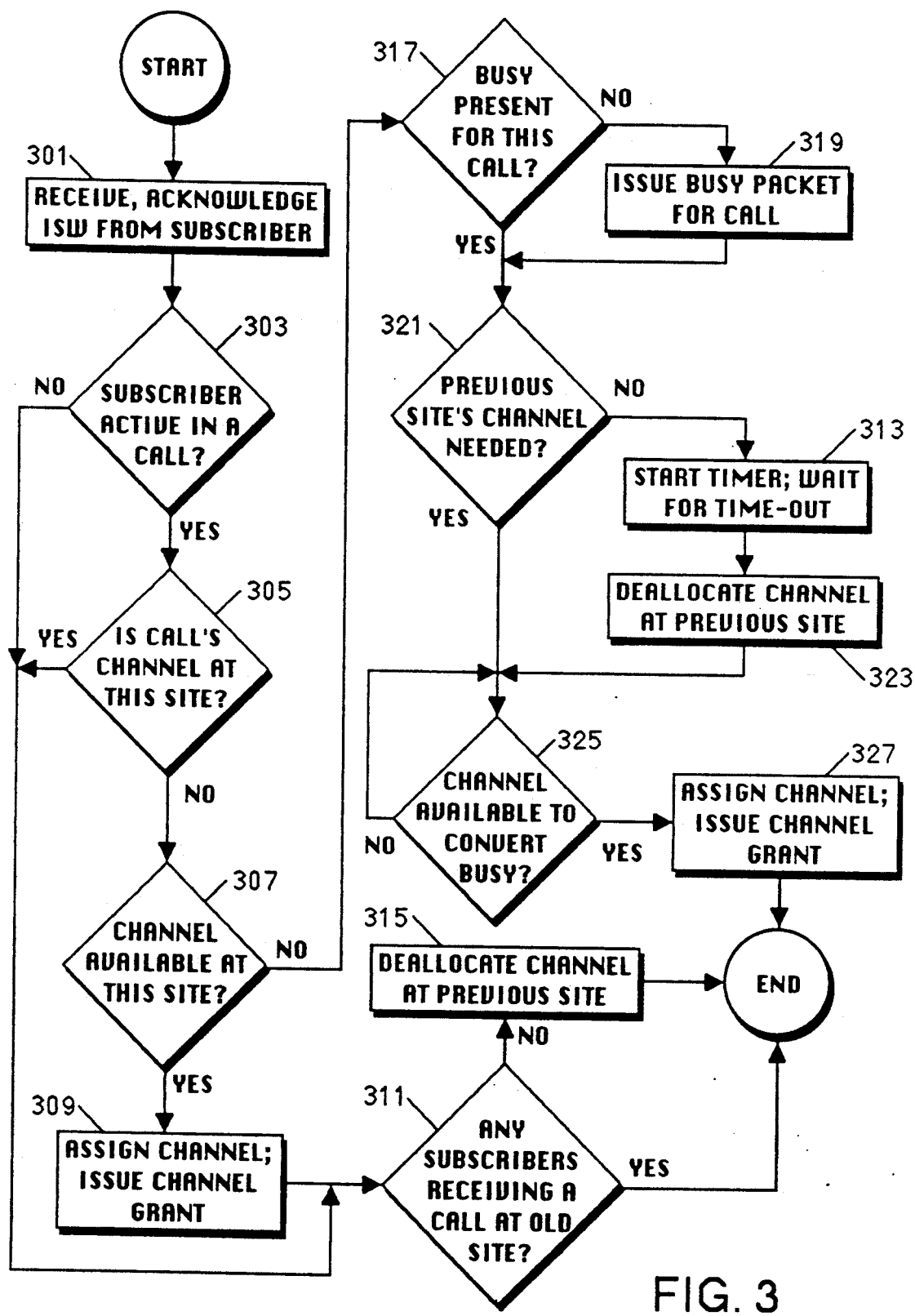
FIG. 3 is a flowchart illustrating multi-site call hand-off with user selectable site switching in a central controller in accordance with the invention.

FIG. 3 is a flowchart illustrating multi-site call hand-off with user selectable site switching in a central controller. As shown in FIG. 3, the central controller receives and acknowledges the ISW from the subscriber at 301. It the subscriber is active in a call at 303 that is not on a channel at the requested site at 305, the central controller seeks an available channel at the requested site at 307. If a channel is available at 307, it is assigned, a channel grant is issued at 309, and, if no subscribers are receiving a call at the old site at 311, the channel is deallocated at 315. If no channel is available at 307, and a busy is not present for this call at 317, a busy packet is issued at 319. If the previous site's channel is not needed at 321, it is deallocated at 323 after a timer is started and allowed to time-out at 313. When a channel is available to convert the busy at 325, the central controller assigns the channel and issues a channel grant at 327.

A detailed technique of call hand-off is described in U.S. patent application Ser. No. 07/457,650, filed on Dec. 27, 1989 on behalf of Richard Alan Comroe et al., titled "Multi-site Dispatch System with Interconnect Hand-off."

We claim:

1. A trunked communication system with at least two communication sites, each with a coverage area, communication resources, and a communication resource allocator, wherein each of the communication sites is assigned at least some of the communication resources, comprising:
   means for assigning a communication resource from a first communication site to a communication device for a call;
   means for determining when said communication device is near an edge of the coverage area of said first communication site during said call;
   means, coupled to said means for determining, for leaving said communication resource from said first communication site;
   means, coupled to said means for leaving, for requesting a communication resource from a second site for said communication device; and
   means for returning said communication device to said communication resource from said first communication site during said call when the communication resources from said second site are busy.

2. The trunked communication system of claim 1 further comprising:
   means, coupled to said means for returning, for informing the communication resource allocator of said return to said communication resource from said first communication site; and
   means, coupled to said means for informing, for removing said request for said communication resource from said second site.

3. The trunked communication system of claim 1 wherein and means for returning further comprises:
   means for notifying a user when the communication resources from said second site are busy; and
   means for returning responsive to a user request.

4. A trunked communication system with at least two communication sites, each with a coverage area, communication resources, and a communication resource allocator, wherein each of the communication sites is assigned at least some of the communication resources, comprising:
   means for assigning a communication resource from a first communication site to a communication device for a call;
   means for determining when said communication device is near an edge of the coverage area of said first communication site during said call;
   means, coupled to said means for determining, for leaving said communication resource from said first communication site;
   means, coupled to said means for leaving, for requesting a communication resource from a second site for said communication device;
   means for returning said communication device to said communication resource from said first communication site during said call when the communication resources from said second site are busy; and means, coupled to said means for requesting, for deallocating said communication resource from said first communication site after expiration of a timer.

5. A method of communication resource allocation in a trunked communication system with at least two communication sites, each with a coverage area, communication resources, and a communication resource allocator, wherein each of the communication sites is assigned at least some of the communication resources, comprising the steps of:

assigning a communication resource from a first communication site to a communication device for a call;

determining when said communication device is near an edge of the coverage area of said first communication site during said call;

leaving, responsive to said step of determining, said communication resource from said first communication site;

requesting, responsive to said step of leaving, a communication resource from a second site for said communication device; and returning said communication device to said communication resource from said first communication site during said call when the communication resources from said second site are busy.

6. The method of communication resource allocation of claim 5 further comprising the steps of:

informing, responsive to said step of returning, the communication resource allocator of said return to said communication resource from said first communication site; and removing, responsive to said step of informing, said request for said communication resource from said second site.

7. The method of communication resource allocation of claim 5 further comprising the step of repeating, responsive to said step of returning, said steps of requesting and returning if said communication resource from said first communication site is unacceptable.

8. The method of communication resource allocation of claim 5 further wherein said step of returning further comprises the steps of:

notifying a user when the communication resources from said second site are busy; and returning responsive to a user request.

9. A method of communication resource allocation in a trunked communication system with at least two communication sites, each with a coverage area, communication resources, and a communication resource allocator, wherein each of the communication sites is assigned at least some of the communication resources, comprising the steps of:

assigning a communication resource from a first communication site to a communication device for a call;

determining when said communication device is near an edge of the coverage area of said first communication site during said call;

leaving, responsive to said step of determining, said communication resource from said first communication site;

requesting, responsive to said step of leaving, a communication resource from a second site for said communication device;

returning said communication device to said communication resource from said first communication site during said call when the communication resources from said second site are busy; and deallocating, responsive to said step of requesting, said communication resource from said first communication site after expiration of a timer.

10. A communication device for use in a trunked communication system with at least two communication sites, each with a coverage area, communication resources, and a communication resource allocator, wherein each of the communication sites is assigned at least some of the communication resources, comprising:

means for receiving a call on a communication resource in a first communication site;

means, coupled to said means for receiving, for determining when the communication device is near an edge of the coverage area of said first communication site during said call;

means, coupled to said means for determining, for leaving said communication resource from said first communication site;

means, coupled to said means for leaving, for requesting a communication resource from a second communication site in the trunked communication system;

means for receiving a busy message in response to said request for said communication resource from said second communication site;

means, coupled to said means for receiving said busy message, for notifying a user of said received busy message; and means, coupled to said means for notifying, for returning the communication device to said communication resource from said first communication site during said call.

11. The communication device of claim 10 further comprising means, coupled to said means for determining, for indicating to the user that the communication device is no longer receiving the call at the first site.

12. The communication device of claim 10 further comprising means for informing the communication resource allocator of said request for said communication resource in said second communication site.

13. The communication device of claim 10 further comprising means for registering a user request, responsive to said notifying of said busy message, to switch said call back to said communication resource from said first communication site.

14. The communication device of claim 10 further comprising means, coupled to said means for return, for removing said request for said communication resource in said second communication site.

15. A method of communication resource allocation in a communication device, with user access, receiving a call on a communication resource in a first communication site, with a coverage area, in a trunked communication system with a communication resource allocator and a second communication site, with a coverage area, with at least two communication resources comprising the steps of:

determining when said communication device is near an edge of the coverage area of the first communication site during the call;

leaving, responsive to said step of determining, said communication resource from said first communication site;

requesting, responsive to said step of leaving, a communication resource from the second communication site in the trunked communication system;

receiving, responsive to said step of requesting, a busy message from the second communication site; notifying the user of said received busy message; and returning, responsive to said step of notifying, the communication device to the communication resource from the first communication site during said call.

16. The method of communication resource allocation in claim 15 further comprising the step of indicating, responsive to said step of determining, to the user that the communication device is no longer receiving the call at the first site.

17. The method of communication resource allocation in claim 15 further comprising the step of informing the communication resource allocator of said request for said communication resource in the second communication site.

18. The method of communication resource allocation in claim 15 further comprising the step of registering, responsive to said step of notifying, a user request to switch the call back to the communication resource from the first communication site.

19. The method of communication resource allocation in claim 15 further comprising the step of removing, responsive to said step of returning, said request for said communication resource in the second communication site.

20. The method of communication resource allocation in claim 15 further comprising the step of repeating, responsive to said step of returning, said steps of requesting, receiving, notifying, registering, and returning if said communication resource from said first communication site is unacceptable.

* * * * *

UNITED STATES PATENT AND TRADEMARK OFFICE
CERTIFICATE OF CORRECTION

PATENT NO. : 5,222,248

DATED : June 22, 1993

INVENTOR(S) : Daniel J. McDonald et al.

It is certified that error appears in the above-identified patent and that said Letters Patent is hereby corrected as shown below:

Col. 4, line 41, "and" should be --said--.

Col. 6, line 49, "return" should be --returning--.

Signed and Sealed this

Twenty-second Day of February, 1994

*Attest:*

BRUCE LEHMAN

*Attesting Officer*         *Commissioner of Patents and Trademarks*